(12) United States Patent
Alayil et al.

(10) Patent No.: US 12,117,188 B2
(45) Date of Patent: Oct. 15, 2024

(54) INDOOR AIR QUALITY MONITORS FOR COMMERCIAL HVAC SYSTEMS

(71) Applicant: Lennox Industries Inc., Richardson, TX (US)

(72) Inventors: Rajesh Alayil, Kerala (IN); Henry Todd Greist, Gainesville, FL (US); Sanjeev Hingorani, Gainesville, FL (US); Thomas John Wolowicz, Allen, TX (US)

(73) Assignee: Lennox Industries Inc., Richardson, TX (US)

( * ) Notice: Subject to any disclaimer, the term of this patent is extended or adjusted under 35 U.S.C. 154(b) by 224 days.

(21) Appl. No.: 17/829,189

(22) Filed: May 31, 2022

(65) Prior Publication Data

US 2023/0383974 A1 Nov. 30, 2023

(51) Int. Cl.
*F24F 11/30* (2018.01)
*F24F 11/70* (2018.01)
*F24F 110/50* (2018.01)

(52) U.S. Cl.
CPC .............. *F24F 11/30* (2018.01); *F24F 11/70* (2018.01); *F24F 2110/50* (2018.01)

(58) Field of Classification Search
CPC ......... F24F 11/30; F24F 11/70; F24F 2110/50
See application file for complete search history.

(56) References Cited

U.S. PATENT DOCUMENTS

| | | | | |
|---|---|---|---|---|
| 6,467,696 | B2* | 10/2002 | Riley | F24F 11/77 62/332 |
| 2009/0266183 | A1* | 10/2009 | Hall | G01R 35/00 73/865.9 |
| 2016/0370301 | A1* | 12/2016 | Oh | G01N 15/0205 |

* cited by examiner

*Primary Examiner* — Larry L Furdge
(74) *Attorney, Agent, or Firm* — Johnston IP Law, PLLC (57) ABSTRACT

An indoor air quality monitor for an HVAC system includes a monitor body formed with a plurality of chambers defined at least in part by chamber walls. A bypass chamber allows for a majority of airflow entering the monitor to pass through. An intake chamber coupled to the bypass chamber allows for a portion of air to be removed for sampling by a particulate sensor. Air from the particulate sensor is discharged to an outlet chamber that is fluidly coupled to a downstream portion of the bypass chamber. The fluid requirements of the particulate sensor are maintained without overwhelming or underwhelming the particulate sensor.

20 Claims, 9 Drawing Sheets

INDOOR AIR QUALITY MONITORS FOR COMMERCIAL HVAC SYSTEMS

TECHNICAL FIELD

This is directed, in general, to heating, ventilating and air conditioning or cooling (HVAC) systems, and more specifically to indoor air quality monitors for HVAC Systems.

BACKGROUND

The following discussion of the background is intended to facilitate an understanding of the present disclosure only. It should be appreciated that the discussion is not an acknowledgment or admission that any of the material referred to was part of the common general knowledge at the priority date of the application.

Heating, ventilating, and air conditioning (HVAC) systems can be used to regulate the environment within an enclosed space. Typically, an air blower is used to pull air (i.e., return air) from the enclosed space into the HVAC system through ducts and push the air into the enclosed space through additional ducts after conditioning the air (e.g., heating or cooling). Unless otherwise indicated, as used throughout this document, "or" does not require mutual exclusivity. Various types of HVAC systems may be used to provide conditioned air for enclosed spaces. At times it is desirable to monitor the air quality associated with an HVAC system.

SUMMARY

According to an illustrative embodiment, an indoor air quality monitor for an HVAC system includes a first cover having a first side wall, a second side wall, a third side wall, a fourth sidewall, and a primary wall. The first cover has a first concave interior portion. The system further includes a plurality of chamber walls extending from the primary wall of the first cover in the first concave interior portion. One member of the plurality of chamber walls is a longitudinal partitioning wall extending from the primary wall into the first concave interior portion. The longitudinal partitioning wall has a first surface and an opposing second surface. The longitudinal partitioning wall is formed with a first aperture and a second aperture.

The system further includes a particulate sensor disposed on the first surface of the longitudinal partitioning wall with a sensor intake aligned with the first aperture through the longitudinal partitioning wall and a sensor outlet aligned with the second aperture through the longitudinal partitioning wall. The system also has a second cover having a primary wall with an interior surface and an exterior surface. The first cover and the second cover mate and couple with the first concave interior portion and the interior surface of the second cover facing each other and forming an interior cavity when in an assembled position.

The system further includes a wall gasket disposed on a portion of the second cover proximate to the interior surface. When assembled, the plurality of chamber walls interface with the wall gasket and form a plurality of chambers including at least a bypass chamber, an intake chamber, and an outlet chamber. The first aperture of the longitudinal partitioning wall is fluidly coupled to the intake chamber, and the second aperture of the longitudinal partitioning wall is fluidly coupled to the outlet chamber. The intake chamber is fluidly coupled to the bypass chamber, and the outlet chamber is fluidly coupled to the bypass chamber downstream of the intake chamber. An intake conduit is fluidly coupled to an upstream portion of the bypass chamber. An outlet conduit is fluidly coupled to a downstream portion of the bypass chamber.

According to an illustrative embodiment, an indoor air quality monitor for an HVAC system includes a monitor body formed with an interior cavity. The monitor body includes a plurality of chamber walls in the interior cavity and forming a plurality of chambers. One wall of the plurality of chamber walls is a longitudinal partitioning wall having a first surface and an opposing second surface. The longitudinal partitioning wall is formed with a first aperture and a second aperture. A particulate sensor is disposed on the first surface of the longitudinal partitioning wall with a sensor intake aligned with the first aperture through the longitudinal partitioning wall and a sensor outlet aligned with the second aperture through the longitudinal partitioning wall. The plurality of chambers includes at least a bypass chamber, an intake chamber, and an outlet chamber. The first aperture of the longitudinal partitioning wall is fluidly coupled to the intake chamber, and the second aperture of the longitudinal partitioning wall is fluidly coupled to the outlet chamber. The intake chamber is fluidly coupled to the bypass chamber, and the outlet chamber is fluidly coupled to the bypass chamber downstream of the inlet chamber. A TVOC sensor may also be included in some embodiments.

According to an illustrative embodiment, a heating, ventilating, and air conditioning system includes an air conditioning section. The air conditioning section includes a return air compartment that receives air from a conditioned space, a mixing compartment coupled to the return air compartment and a source of outside air, a filter section, a cooling section, and a conditioned air section that is delivered to the conditioned space. The system further includes a first indoor air quality monitor having an inlet conduit and an outlet conduit. The inlet conduit of the first indoor air quality monitor is fluidly coupled to the mixing compartment and the outlet conduit of the first indoor air quality monitor is disposed between the filter section and the cooling section. The system also includes a second indoor air quality monitor having an inlet conduit and an outlet conduit. The inlet conduit of the second indoor air quality monitor is fluidly coupled to between the filter section and the cooling section and the outlet conduit of the second indoor air quality monitor is fluidly coupled downstream of the cooling section.

The first indoor air quality monitor and the second indoor air quality monitor each include a first cover having a first side wall, a second side wall, a third side wall, a fourth sidewall, and a primary wall. The first cover has a first concave interior portion. Each of the indoor air quality monitors also includes a plurality of chamber walls extending from the primary wall of the first or the second cover in an interior cavity. One of the plurality of chamber walls is a longitudinal partitioning wall extending from the primary wall into the first concave interior portion. The longitudinal partitioning wall has a first surface and an opposing second surface. The longitudinal partitioning wall is formed with a first aperture and a second aperture.

A particulate sensor is disposed on the first surface of the longitudinal partitioning wall with a sensor intake aligned with the first aperture through the longitudinal partitioning wall and a sensor outlet aligned with the second aperture through the longitudinal partitioning wall. Each indoor air quality monitor further includes a second cover having a primary wall with an interior surface and an exterior surface. The first cover and the second cover mate and couple with the first concave interior portion and the interior surface of the second cover facing each other and forming the interior cavity when in an assembled position.

When assembled, the plurality of chamber walls form, at least in part, a plurality of chambers including at least a bypass chamber, an intake chamber, and an outlet chamber. The first aperture of the longitudinal partitioning wall is fluidly coupled to the intake chamber, and the second aperture of the longitudinal partitioning wall is fluidly coupled to the outlet chamber. The intake chamber is fluidly coupled to the bypass chamber, and the outlet chamber is fluidly coupled to the bypass chamber downstream of the inlet chamber.

DESCRIPTION OF THE DRAWINGS

Illustrative embodiments of the present invention are described in detail below with reference to the attached drawing figures, which are incorporated by reference herein and wherein.

DETAILED DESCRIPTION

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims.

Unless otherwise indicated, as used throughout this document, "or" does not require mutual exclusivity.

Figure 1:
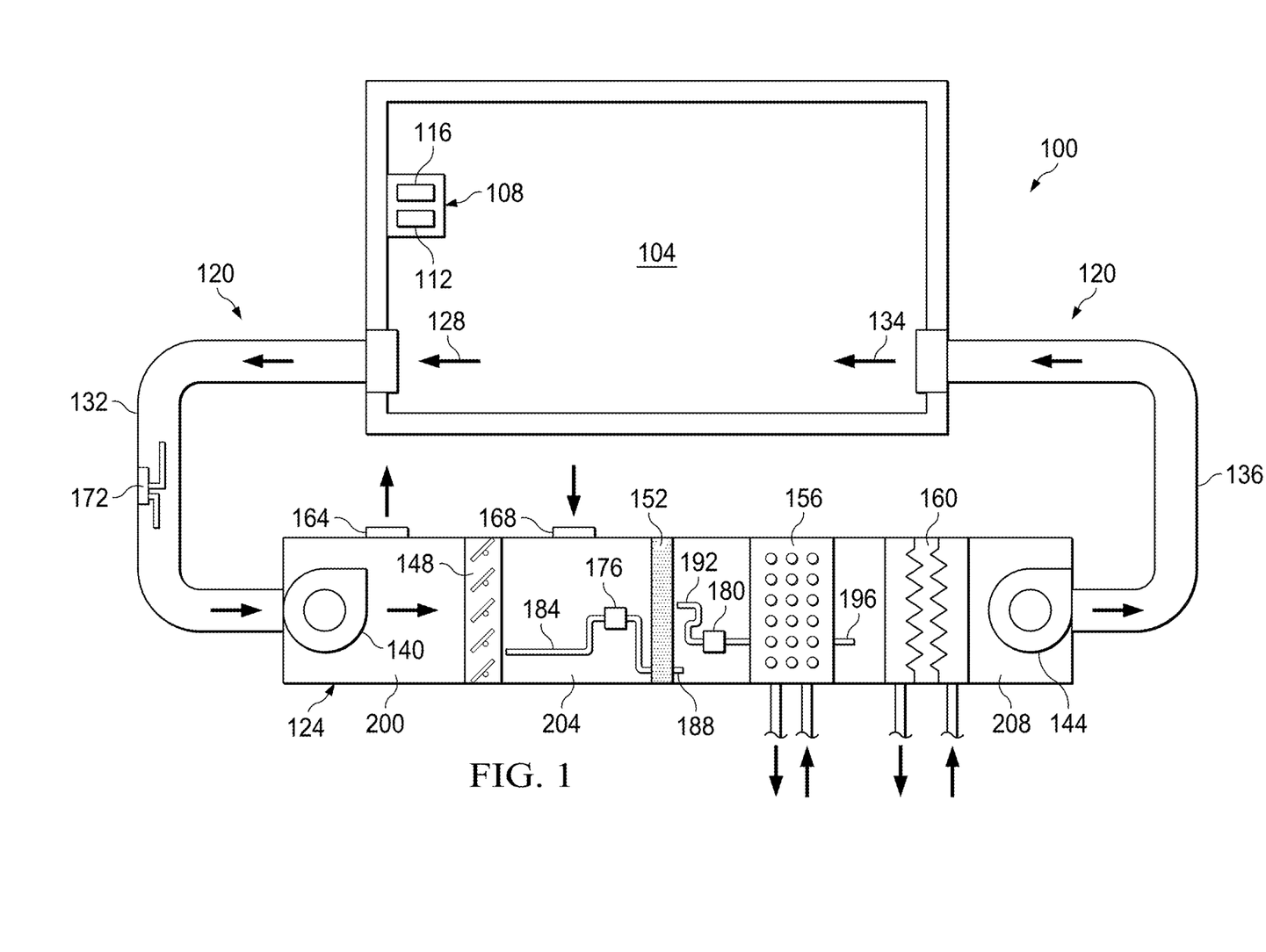
FIG. 1 is a schematic diagram of an illustrative embodiment of a heating, ventilating, and air conditioning (HVAC) system with illustrative embodiments of indoor air quality monitor deployed.

Referring now to the drawings and initially to FIG. 1, a heating, ventilating, and air conditioning (HVAC) system 100 is presented. The HVAC system 100 is for providing conditioned air to a first closed space or conditioned space 104, such as the interior of a building. The interior or elsewhere may have a smart thermostat or control unit 108 that may include a processor 112 and non-transitory memory 116 for carrying out various functions including calculating effectiveness of a filter based on date presented from an upstream and downstream side of the filter. The controller 108 may be inside the HVAC control compartment and be part of the overall unit control scheme in some embodiments.

A plurality of closed ducts 120 may facilitate air moving from the conditioned spaced 104 through a conditioning unit 124 and back to the conditioned space 104. Return air 128 may enter a return duct 132 of the ducts 120 and thereby be delivered to the conditioning unit 124. After the air is addressed in the conditioning unit 124, the conditioned air 134 may be delivered by a delivery duct 136 to the conditioned space 104.

The conditioning unit 124 may have one or more blowers 140, 144, a damper 148 for directing outside air into the system, a filter 152, a cooling unit 156, heating unit 160, and other aspects as those skilled in the art will appreciate. An exhaust 164 and outside air intake 168 may be included.

One or more indoor air quality monitors are included as an aspect of the system 100. In one embodiment, a single indoor air quality monitor 172 may be placed in the return duct 134. In some embodiments a first indoor air quality monitor 176 and a second indoor air quality monitor 180 are included in the conditioning unit 124 and may sample air on different sides of a component, e.g., the filter 152 as shown. Thus, the first indoor air quality monitor 176 has an intake tube 184 that pulls air upstream of the filter 152 and an outlet tube 188 that returns the air downstream of the filter 152.

Likewise, the second indoor air quality monitor 180 has an intake tube 192 upstream of the cooling unit 156 and an outlet tube 196 downstream of the cooling unit 156. In this way, air quality data may be developed by the first air quality monitor 176 and by the second air quality monitor 180 and the data sent wirelessly (e.g., Low energy Bluetooth (BLE) or other wireless) or otherwise to the controller 108 which can compare the data and determine performance of the filter 152 as well as monitor conditions of the air. Another illustrative embodiment of an indoor air quality monitor with intake and outlet tubes is shown in FIG. 10 and discussed further below. In addition, in some embodiments, the controller 108 can contact and display the status of the air quality to a building energy management system.

The HVAC system 100 includes various compartments and sections. A return air compartment 200 receives air from the conditioned space 104 and may remove air 164 in some situations. The continuing air is moved to a mixing compartment 204. The mixing compartment 204 is fluidly coupled to the return air compartment 200 and the source of outside air intake 168. The air goes through the filter 152, or filter section, before reaching the cooling unit 156 (or cooling section). The heating unit 160 or heating coil is provided as well. Finally, there is a condition air section 208 from which air is delivered to the conditioned space. Those skilled in the art will appreciate that many different HVAC system configurations may be used in which indoor air monitoring is desired. One more illustrative embodiment of a system 100 is presented next.

Figure 2:
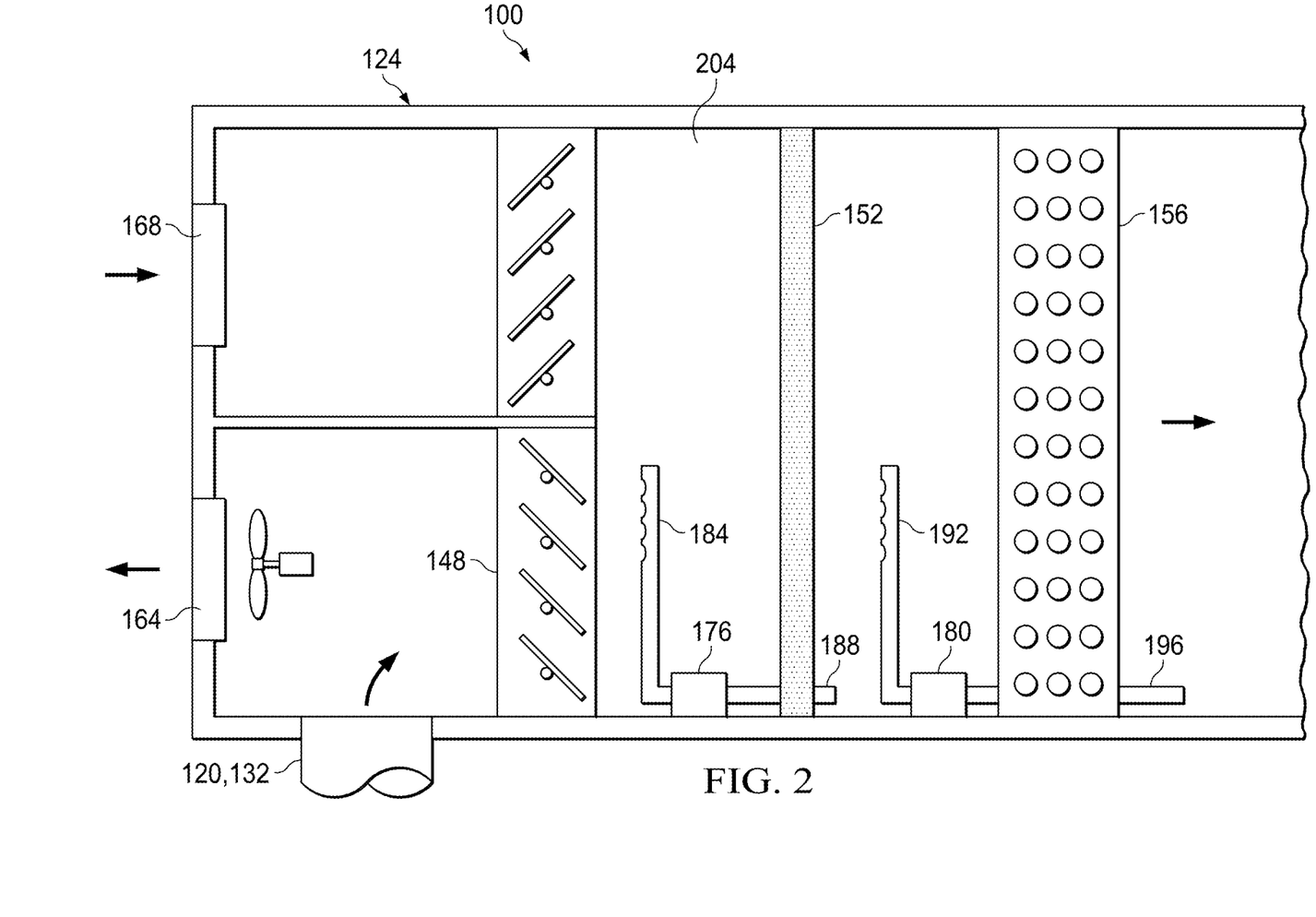
FIG. 2 is a schematic diagram of a portion of an illustrative embodiment of a heating, ventilating, and air conditioning (HVAC) system with illustrative embodiments of indoor air quality monitor deployed.

Referring now primarily to FIG. 2, a portion of an HVAC system 100 is presented that shows a portion of the conditioning unit 124. The portion of the conditioning unit 124 is analogous in many respects to the system 100 shown in FIG. 1 and, for that reasons, only some aspects are explicitly referenced here. In this embodiment, return is shown delivered in return duct 132 of the ducts 120 from where some may be removed through the exhaust 164 and portions may continue to the mixing chamber 204 depending on the position of dampener 148. At this stage outside air may be introduced through outside air intake 168 to address air quality. It should be noted that in some embodiments the indoor air quality monitors 176, 180 may send a signal to the controller 108 (FIG. 1) that activates the dampener 148 as needed to adjust air quality.

Figure 3:
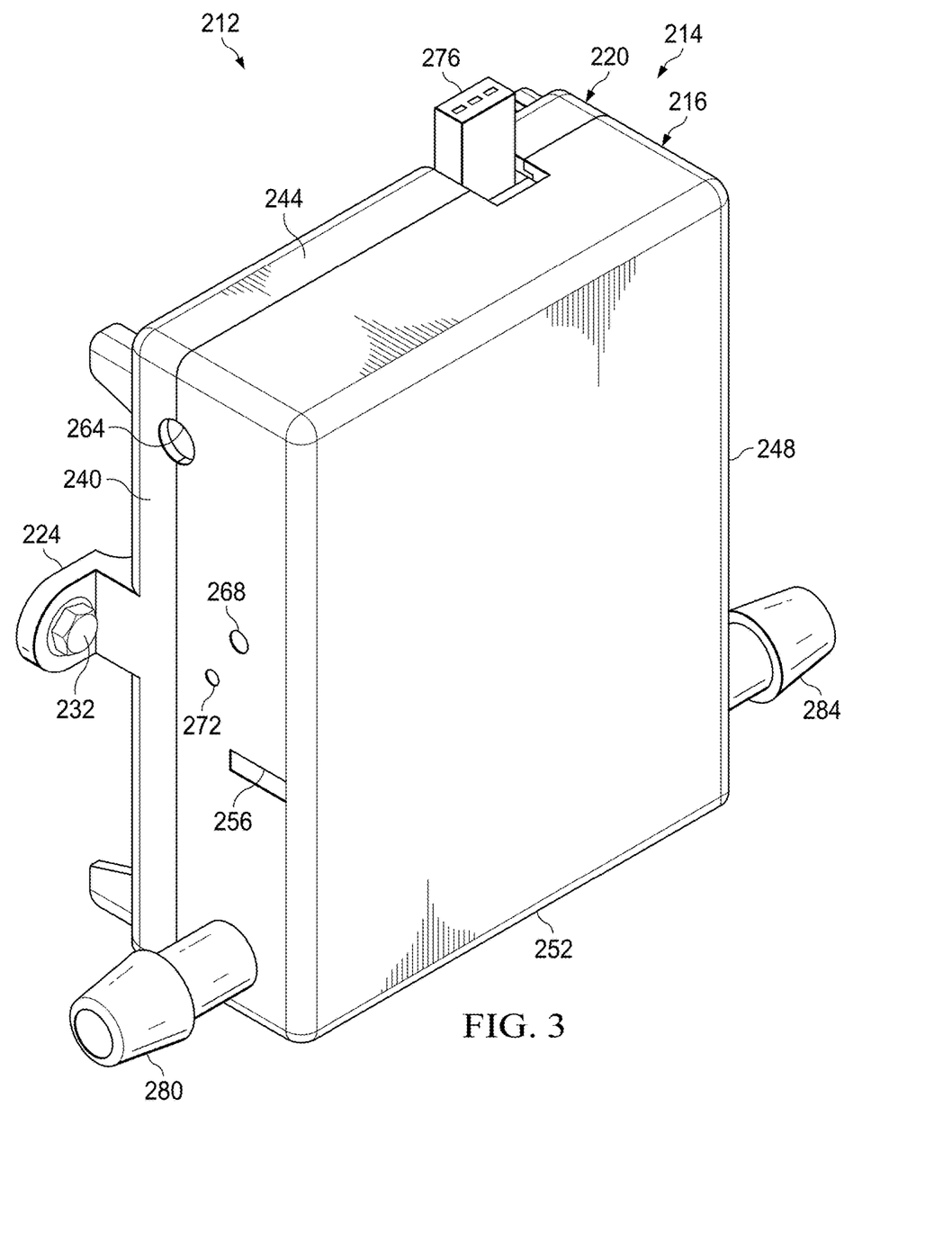
FIG. 3 is a schematic, perspective view of an illustrative embodiment of an indoor air quality monitor for an HVAC system.
Figure 4:
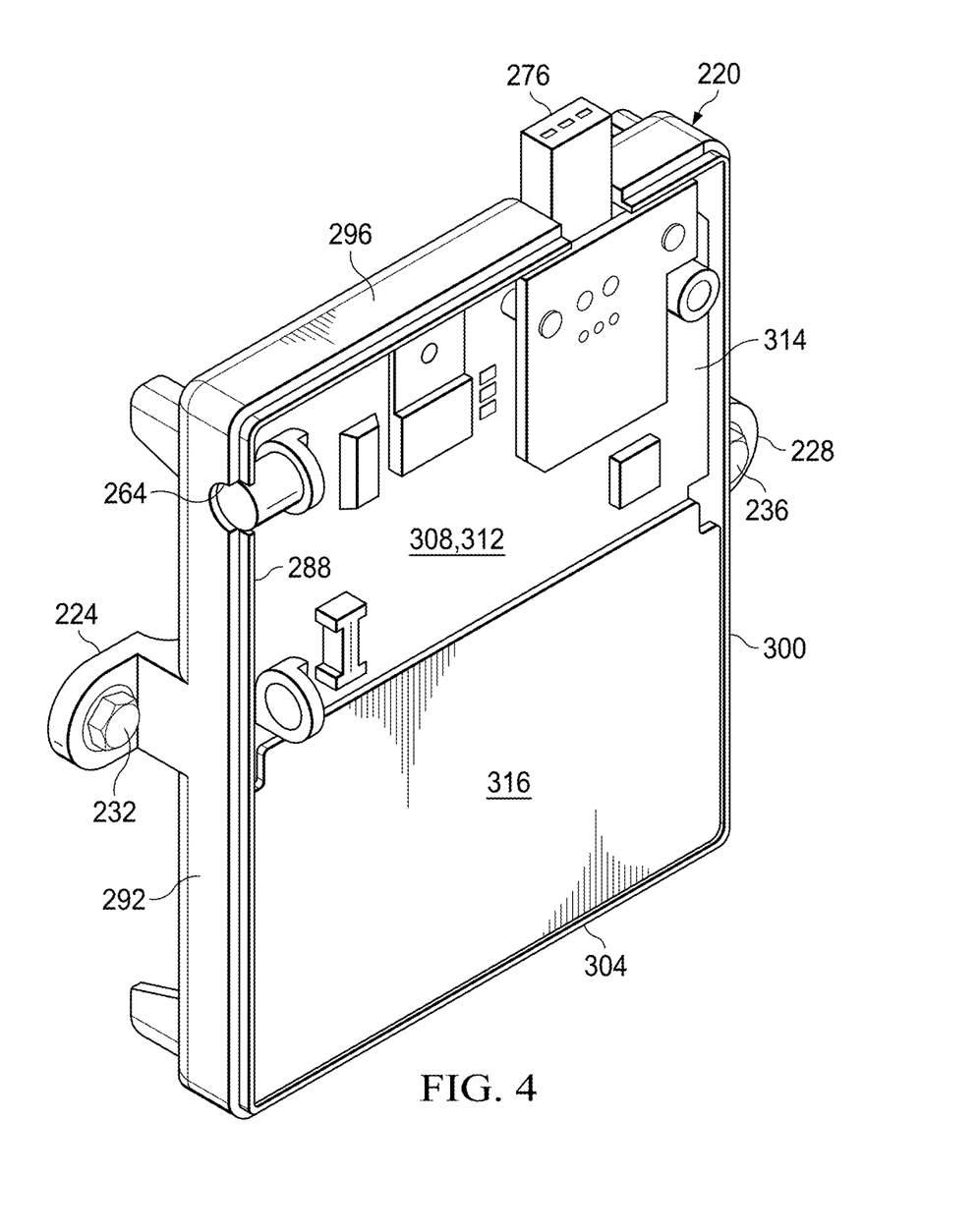
FIG. 4 is a perspective view of a portion of the indoor air quality monitor of FIG. 3.
Figure 5:
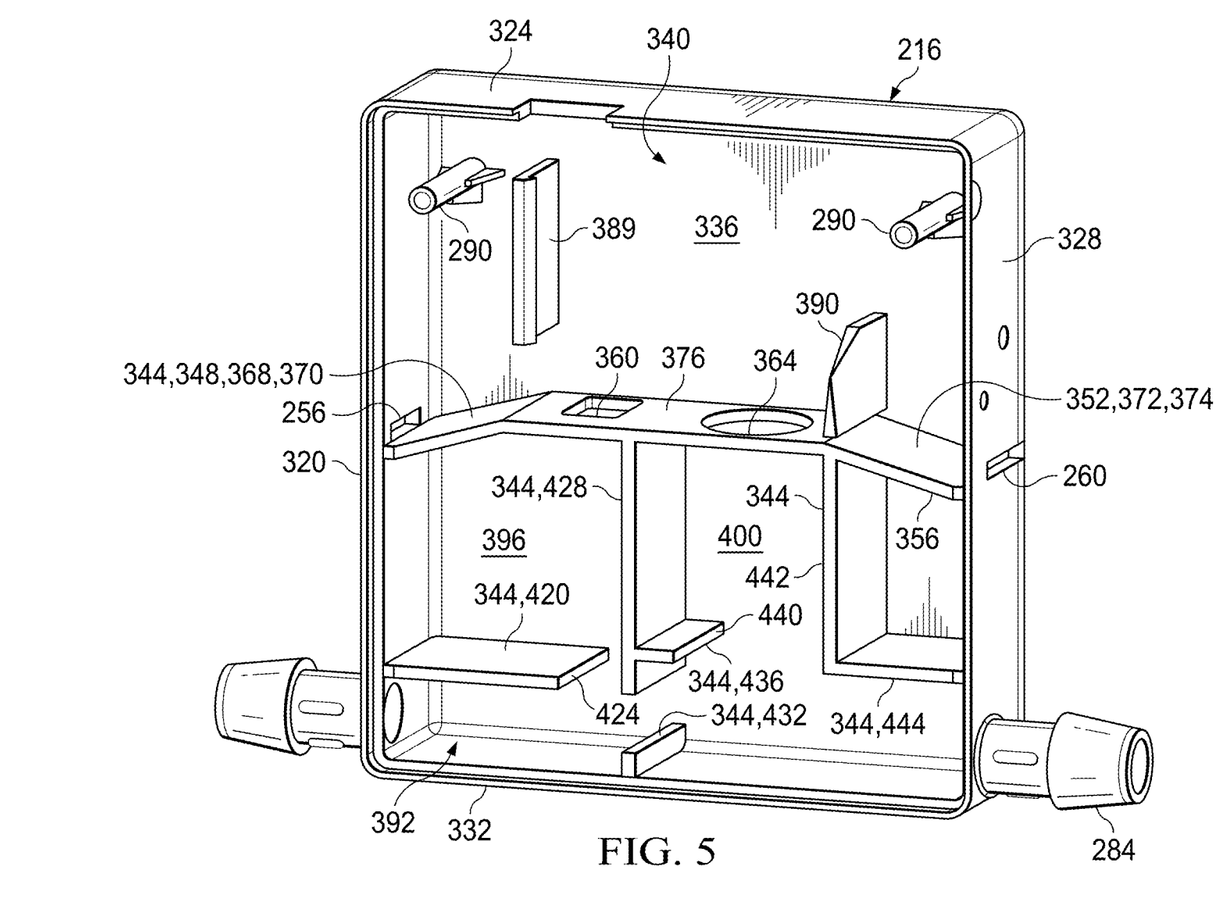
FIG. 5 is a perspective view of another portion of the indoor air quality monitor of FIG. 3.

Referring now primarily to FIGS. 3-5, an illustrative embodiment of an indoor air quality monitor 212 is presented. The indoor air quality monitor 212 may be used as the indoor air quality monitors 172, 176, 180 in FIGS. 1-2. The indoor air quality monitor 212 has a monitor body 214 that maybe formed as unit or may formed as a first cover 216 and a second cover 220 that are coupled to form the body 214. The monitor body 214 may be formed of any suitable rigid material, e.g., a thermoplastic polymer. The indoor air quality monitor 212 may be mounted inside the ducts 120, including the conditioning unit 124, as shown in FIGS. 1 and 2.

As shown well in FIG. 3, the indoor air quality monitor 212 is mounted with a plurality of brackets, e.g., a first bracket 224 and second bracket 228 with concomitant fasteners 232, 236, such as bolts or screws. The indoor air quality monitor 212 has a first side wall 240, second side wall 244, a third side wall 248, and a fourth side wall 252. In FIG. 3, one may see that the indoor air quality monitor 212 is formed with a first vent slot 256 to allow venting of at least a portion of an interior cavity within the indoor air quality monitor 212. A second vent slot 260 (FIG. 5) may be formed on the opposite side wall as well, i.e., the third side wall 248. Also visible on the first side wall 240 are control buttons and inputs, e.g., enable switch 264, on/off switch 268, and reset 272. A connector 276 extends from the second wall 244. FIG. 3 also shows an intake conduit 280 for introducing air into the indoor air quality monitor 212 and an outlet conduit 284 for expelling air from the indoor air quality monitor 212.

In one illustrative embodiment, the monitor body 214 is formed with the coupling of the first cover 216 to the second cover 220. One or both covers 216, 220 may include a stepped lip 288 (FIG. 4) for forming a substantially airtight seal when mated with the other cover. The first cover 216 and the second cover 220 mate and couple with the first concave interior portion 340 (FIG. 5) and the interior surface 312 of the second cover 220 facing each other and forming the interior cavity when in an assembled position. As shown in in FIG. 5, one or more screw bosses 290 with concomitant screws or other fasteners. In some embodiments, an interference fit may be used for the coupling. In still other embodiments, the coupling may be accomplished with embedded plastic clips.

Referring now primarily to FIG. 4, the second cover 220 is presented. The second cover 220 a first side wall 292, second side wall 296, third side wall 300, fourth side wall 304, and a primary wall 308. The primary wall 308 has an interior surface or area 312 that may have one or more printed circuit boards (PCB) 314 applied to a portion and another portion that has a wall gasket 316. The wall gasket 316 may be any suitable material, that does not contaminant and has minimal off gassing. In some embodiments, the wall gasket 316 is synthetic rubber or fluoropolymer elastomer, e.g., VITON.

Referring now primarily to FIG. 5, the first cover 216 is presented. The first cover 216 includes a first side wall 320, a second side wall 324, a third side wall 328, a fourth sidewall 332, and a primary wall 336. The first cover 216 has a first concave interior portion 340. A plurality of chamber walls 344 extend from the primary wall 336 of the first cover 216 in the first concave interior portion 340. The plurality of chamber walls 344 includes a longitudinal partitioning wall 348 that extends from the primary wall 336 into the first concave interior portion 340. The longitudinal partitioning wall 348 includes a first surface 352 and an opposing second surface 356. The longitudinal partitioning wall 348 is formed with a first aperture 360 and a second aperture 364.

The longitudinal partitioning wall 348 has a first angled portion 368 that slants downward on an upstream portion 370 and a second angled portion 372 that slants downward on a downstream portion 374 to facilitate removal of any condensate through the vent slots 256, 260. In one embodiment, the slant downward at each end is between 0.1 and 15 degrees. The first cover 216 has the first vent slot 256 formed proximate to an upstream edge of the longitudinal partitioning wall 348 and the second vent slot 260 formed proximate to a downstream edge of the longitudinal partitioning wall 348. As used herein, downward and upward are referenced for the orientation when the fourth wall 332 of the first cover 216 is orthogonal to gravity. The longitudinal partitioning wall 348 may include an intermediate portion 376 that is level for the shown orientation between the first angled portion 368 and the second angled portion 372. The longitudinal partitioning wall 348 forms an upper portion and a lower portion (for the orientation shown) of the interior cavity.

Figure 6:
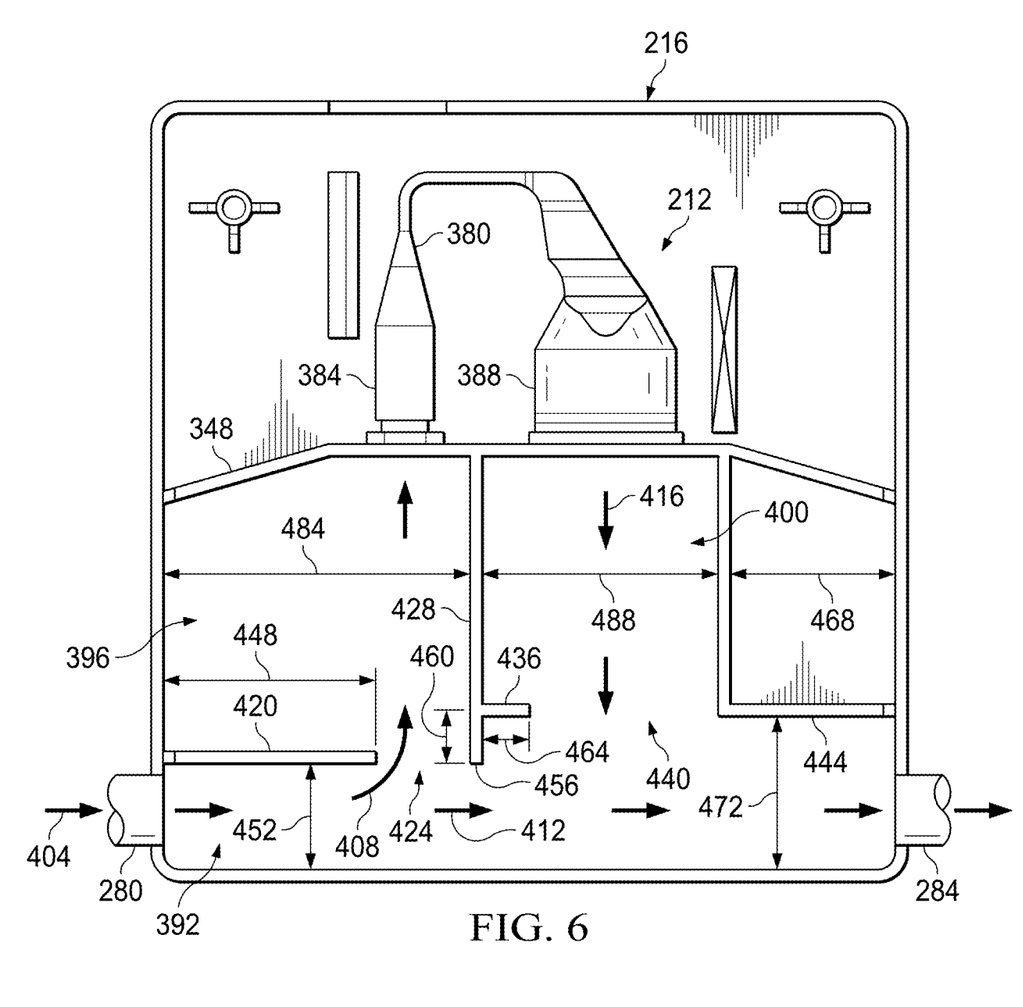
FIG. 6 is a schematic diagram showing interior aspects of an illustrative embodiment of an indoor air quality monitor for an HVAC system.

Referring primarily to FIG. 5 and to a lesser extent to FIG. 6, a particulate sensor 380 is disposed within an interior cavity of the indoor air quality monitor 212 on the first surface 352 of the longitudinal partitioning wall 348 with a sensor intake 384 aligned with the first aperture 360 through the longitudinal partitioning wall 348 and a sensor outlet 388 aligned with the second aperture 364 through the longitudinal partitioning wall 348. The particulate sensor 380 may include a fan in the sensor outlet 388 in some embodiments. In one illustrative embodiment, the particulate sensor 380 comprises a SEN44 or SEN45 from Sinsirion and only needs a small airflow, e.g., on the order of 17 mili CFM. The particulate sensor 380 may, in part, be held in position by one or more particulate-sensor-positioning internal walls, e.g., a first particulate-sensor-positioning internal wall 389 and a second particulate-sensor-positioning internal wall 390. The first particulate-sensor-positioning internal wall 389 is displaced from the second particulate-sensor-positioning internal wall 390.

Referring again primarily to FIGS. 4 and 5, when assembled, the plurality of chamber walls 344 interface with the wall gasket 316 and form a plurality of chambers including at least a bypass chamber 392, an intake chamber 396, and an outlet chamber 400. The first aperture 360 of the longitudinal partitioning wall 348 is fluidly coupled to the intake chamber 396. The second aperture 364 of the longitudinal partitioning wall 348 is fluidly coupled to the outlet chamber 400. The intake chamber 396 is fluidly coupled to the bypass chamber 392 and the outlet chamber 400 is fluidly coupled to the bypass chamber 392 downstream of the intake chamber 396. The intake conduit 280 is fluidly coupled to the bypass chamber 392 and via the bypass chamber 392 to the intake chamber 396. The intake tubes 184, 192 (FIGS. 1 and 2) are fluidly coupled to the intake conduit 280. The outlet chamber 400 is fluidly coupled via the bypass chamber 392 to the outlet conduit 284. The outlet tubes 188, 196 (FIGS. 1 and 2) are fluidly coupled to the outlet conduit 284.

Referring now primarily to FIG. 6, a portion of an illustrative embodiment of an indoor air quality monitor 212 is presented. Only aspects are presented for purposes of providing certain dimensions and relatives sizing as well as showing air flow.

With respect to the airflow, air 404 enters the bypass chamber 392 and a portion 408 enters the intake chamber 396 before being delivered to the particulate sensor 380. Another portion 412, the main portion, flows through the bypass chamber 392 and exits. Air 416 released by the particulate sensor 380 enters the outlet chamber 400 and continues from there into the bypass chamber 392 where it exists the indoor air quality monitor 212.

In this view, some of the plurality of chamber walls 344 may further described. A first longitudinal member 420 extends from the first wall in the direction of fluid flow and leads to a first intake chamber aperture 424. An intake-outlet wall 428 is proximate to one side of the intake chamber aperture 424. In some embodiments, a bypass fin 432 (FIG. 5) is positioned in the bypass chamber 392 on the fourth wall and substantially aligned with the intake-outlet wall 428. An exit fin 436 may extend longitudinally in a downstream direction from the intake-outlet wall 428 and leads to a first outlet chamber aperture 440. An outlet chamber wall 442 is to one side. A second longitudinal member 444 extends substantially longitudinally from the third side wall.

The first longitudinal member 420 has a longitudinal dimension 448 and is above the fourth wall by a dimension 452. The exit fin 436 may be displaced (vertically for orientation shown) from a distal end 456 of the intake-outlet wall 428 by a dimension 460. The exit fin 436 may have a longitudinal dimension 464. The second longitudinal member or wall 444 may have a longitudinal dimension 468 from the third wall and be displaced from the fourth wall by a dimension 472. The bypass chamber may have a later width (into the page) of dimension 476 (not explicitly shown). The bypass fin 432 (FIG. 5) may have a dimension 480 (not explicitly shown) extending from the fourth wall. Note that the diameter of the intake conduit 280 is smaller than dimension 452. The longitudinal length of the interior of the intake chamber 396 is dimension 484. The longitudinal dimension of the outlet chamber 400 is dimension 488. Also, in this view one may appreciate that the volume $V_1$ of the intake chamber 396 is greater than the volume $V_2$ of the outlet chamber 400.

In one illustrative embodiment, the dimensions were as follows:
Dimension 448=1.0 inches
Dimension 452=0.7 inches
Dimension 460=0.25 inches
Dimension 464=0.25 inches
Dimension 468=0.86 inches
Dimension 472=0.7 inches
Dimension 476=1 inch
Dimension of height of bypass fin 432 (FIG. 5)=0.25 inches
Dimension 484=1.5 inches
Dimension 488=1.25 inches
The diameter of the intake conduit 280 and outlet conduit 284 were 0.319 inches.

In one illustrative embodiment, the indoor air quality monitor 212 has a longitudinal length, L, which excludes the lengths of the intake conduit 280 and outlet conduit 284, and the bypass chamber 392 is sized as follows. The first longitudinal member 420 has a longitudinal length between 0.2 L and 0.35 L. The bypass fin 432 has length between 0.03 L and 0.08 L. The exit fin 436 has a length between 0.06 L to 0.08 L. The second longitudinal member 444 has a length between 0.18 L and 0.3 L. The height of the bypass chamber 392 may be between 0.1 L and 0.3 L.

Figure 7:
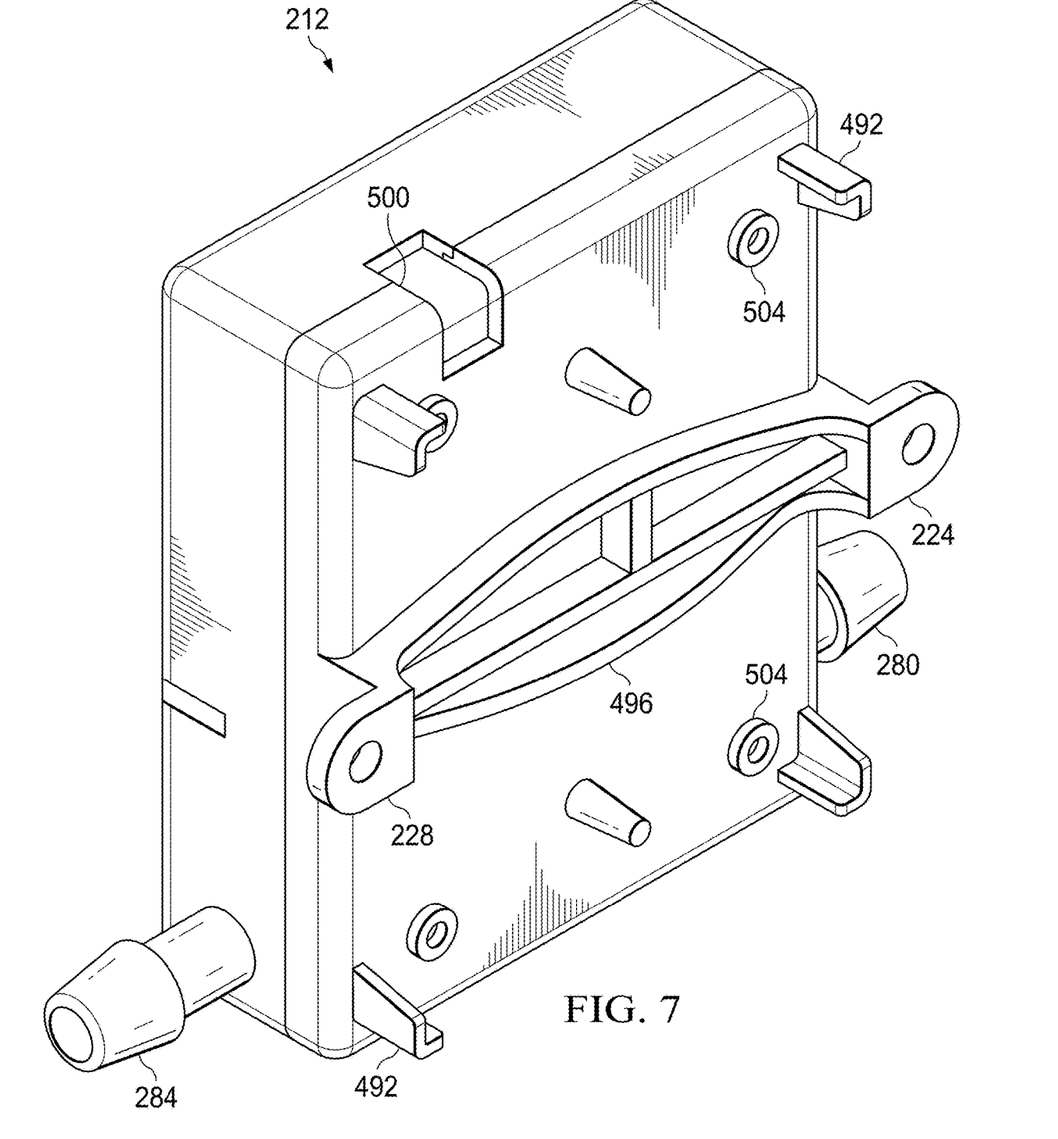
FIG. 7 is a schematic, rear, perspective view of an illustrative embodiment of an indoor air quality monitor for an HVAC system.

Referring now primarily to FIG. 7, a rear view of an illustrative embodiment of an indoor air quality monitor 212 is presented. The indoor air quality monitor 212 may have a plurality of offset legs 492 on that side. This view shows that some embodiments may include strengthening ribs 496, which may be an aspect of the brackets 224, 228. In this view, one may see a connector aperture 500 and some of the fasteners 504 that may be used in coupling the first cover and second cover.

Figure 8:
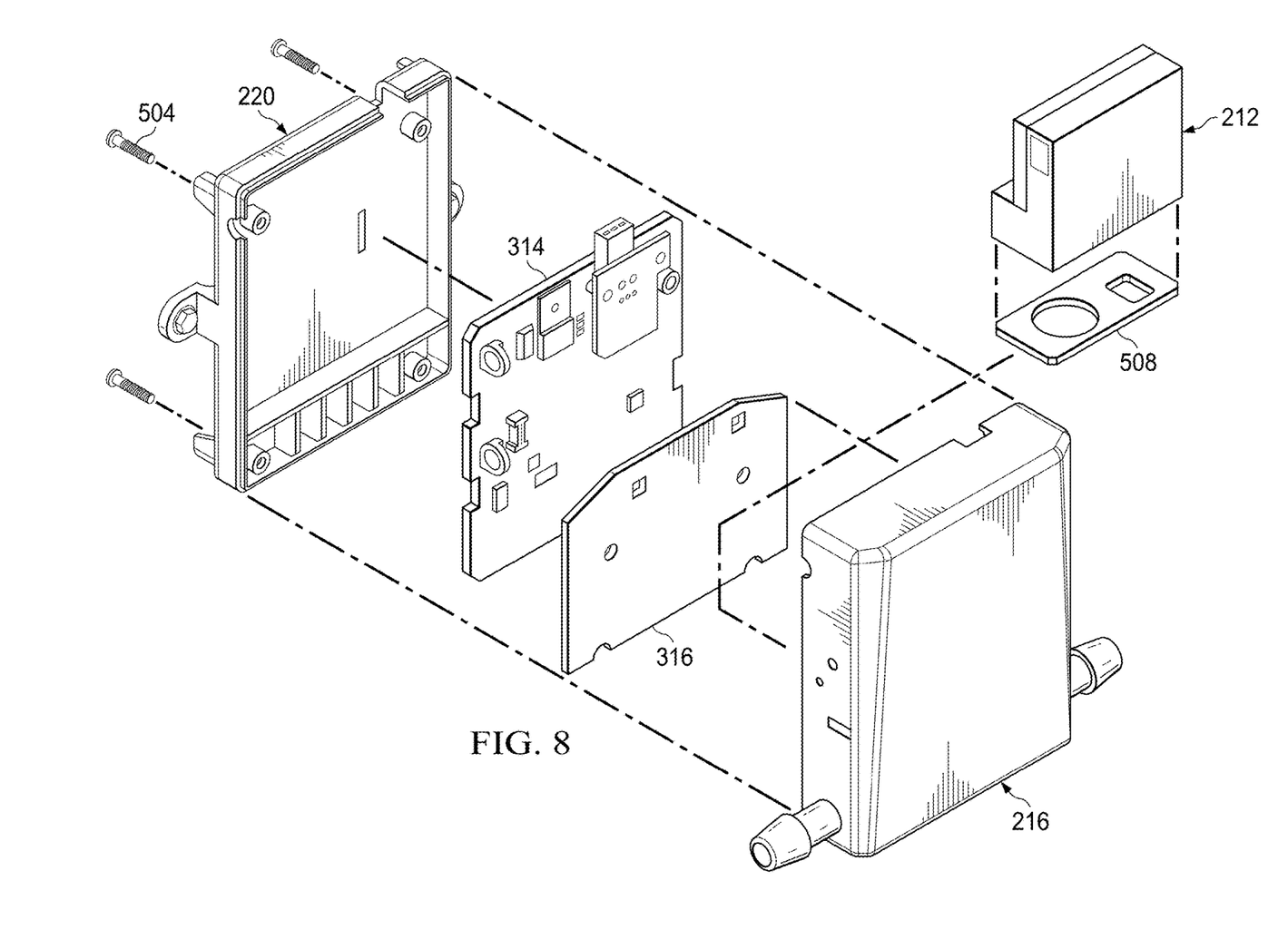
FIG. 8 is a schematic, exploded, perspective view of an illustrative embodiment of an indoor air quality monitor for an HVAC system.

Referring now primarily to FIG. 8, an exploded, perspective view of an illustrative embodiment of an indoor air quality monitor 212 is presented. This view shows components previously discussed and further makes visible that a gasket 508 may be included between the particulate sensor 212 and the first surface of the longitudinal partitioning wall 348.

Figure 9:
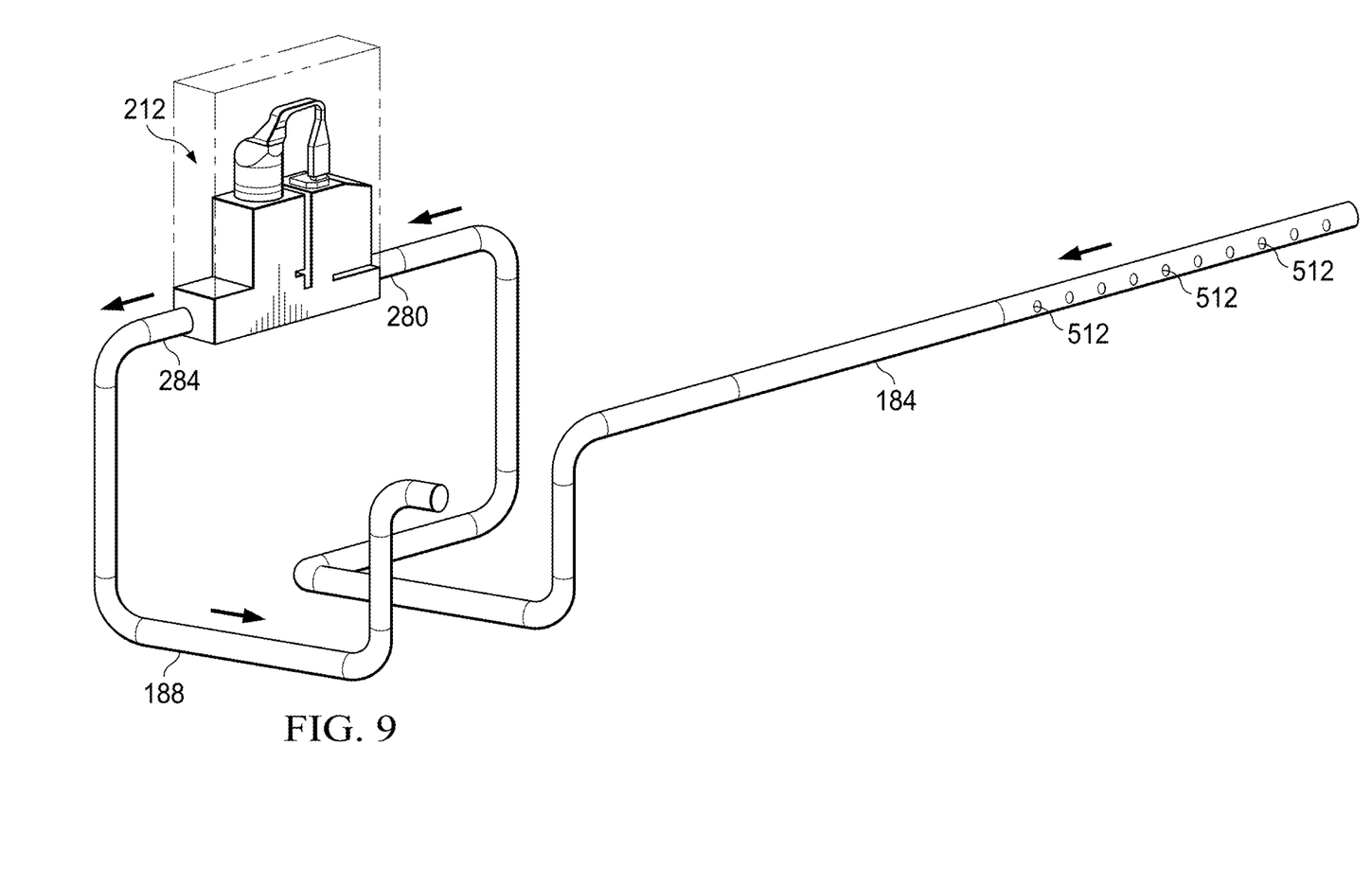
FIG. 9 is a schematic, perspective view of an illustrative embodiment of an indoor air quality monitor for an HVAC system showing intake and outlet tubing.

Referring now primarily to FIG. 9, an illustrative embodiment of an indoor air quality monitor 212 with an inlet tube 184 and an outlet tube 188 attached to the intake conduit 280 and outlet conduit 284, respectively. In this view, one may see that the intake conduit 280 may include a plurality of probe apertures 512. The tubes 184, 188 are shown with various bends that may be applied to go around filters or cooling units or other components as suggested in FIGS. 1 and 2.

According to an illustrative embodiment, an indoor air quality monitor 212 for an HVAC system 100 includes a monitor body 214 formed with an interior cavity. The monitor body 214 includes a plurality of chamber walls 344 in the interior cavity and forming a plurality of chambers. One of the plurality of chamber walls 344 is a longitudinal partitioning wall 348 having a first surface 352 and an opposing second surface 356. The longitudinal partitioning wall 348 is formed with a first aperture 360 and a second aperture 364. A particulate sensor 380 is disposed on the first surface 352 of the longitudinal partitioning wall 348 with a sensor intake 384 aligned with the first aperture 360 through the longitudinal partitioning wall 348 and a sensor outlet 388 aligned with the second aperture 364 through the longitudinal partitioning wall 348. The plurality of chambers includes at least a bypass chamber 392, an intake chamber 396, and an outlet chamber 400. The first aperture 360 of the longitudinal partitioning wall 348 is fluidly coupled to the intake chamber 396, and the second aperture 364 of the longitudinal partitioning wall 348 is fluidly coupled to the outlet chamber 400. The intake chamber 396 is fluidly coupled to the bypass chamber 392, and the outlet chamber 400 is fluidly coupled to the bypass chamber 392 downstream of the inlet chamber 396.

According to an illustrative embodiment, a heating, ventilating, and air conditioning system 100 includes a return air compartment that receives air from a conditioned space, a mixing compartment coupled to the return air compartment and a source of outside air, a filter section, a cooling section, and a conditioned air section that is delivered to the conditioned space. The system further includes a first indoor air quality monitor having an inlet conduit and an outlet conduit. The inlet conduit of the first indoor air quality monitor is fluidly coupled to the mixing compartment and the outlet conduit of the first indoor air quality monitor is disposed between the filter section and the cooling section. The system also includes a second indoor air quality monitor having an inlet conduit and an outlet conduit. The inlet conduit of the second indoor air quality monitor is fluidly coupled to between the filter section and the cooling section and the outlet conduit of the second indoor air quality monitor is fluidly coupled downstream of the cooling section.

The first indoor air quality monitor and the second indoor air quality monitor each include a first cover having a first side wall, a second side wall, a third side wall, a fourth sidewall, and a primary wall. The first cover has a first concave interior portion. Each of the indoor air quality monitors also includes a plurality of chamber walls extending from the primary wall of the first or the second cover in an interior cavity. One of the plurality of chamber walls is a longitudinal partitioning wall extending from the primary wall into the first concave interior portion. The longitudinal partitioning wall has a first surface and an opposing second surface. The longitudinal partitioning wall is formed with a first aperture and a second aperture.

A particulate sensor is disposed on the first surface of the longitudinal partitioning wall with a sensor intake aligned with the first aperture through the longitudinal partitioning wall and a sensor outlet aligned with the second aperture through the longitudinal partitioning wall. Each indoor air quality monitor further includes a second cover having a primary wall with an interior surface and an exterior surface. The first cover and the second cover mate and couple with the first concave interior portion and the interior surface of the second cover facing each other and forming the interior cavity when in an assembled position.

When assembled, the plurality of chamber walls form, at least in part, a plurality of chambers including at least a bypass chamber, an intake chamber, and an outlet chamber. The first aperture of the longitudinal partitioning wall is fluidly coupled to the intake chamber, and the second aperture of the longitudinal partitioning wall is fluidly coupled to the outlet chamber. The intake chamber is fluidly coupled to the bypass chamber, and the outlet chamber is fluidly coupled to the bypass chamber downstream of the inlet chamber.

According to an illustrative embodiment, an indoor air quality monitor for an HVAC system includes a monitor body formed with a plurality of chambers defined at least in part by chamber walls. A bypass chamber allows for a majority of airflow entering the monitor to pass through. An intake chamber coupled to the bypass chamber allows for a portion of air to be removed for sampling by a particulate sensor. Air from the particulate sensor is discharged to an outlet chamber that is fluidly coupled to a downstream portion of the bypass chamber. The fluid requirements of the particulate sensor are maintained without overwhelming or underwhelming the particulate sensor.

According to another illustrative embodiment, a $CO_2$ sensor may be added within the interior cavity of the monitor body. In some illustrative embodiments a TVOC sensor is included within the interior intake chamber 396 to allow the simultaneous measurement of particles and Total Volatile Organic compounds (TVOC); for example in FIG. 8, the little box just below the electrical connection daughter board (shown on right of orientation shown) and adjacent to the notch on the right in the control board is where the TVOC sensor may be placed.

In one illustrative embodiment, a small fan may be positioned in chamber 392 (FIG. 5) and sandwiched in between shelf 420 and wall 332 to aid in flow through the bypass under very low flow conditions and to reduce the time to respond or to increase sensitivity with very long sensing tubes 184 (FIG. 9). In some embodiments, an external fan may be flow coupled with either tube 184 or 188 and be external to the monitor housing itself.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. An indoor air quality monitor for an HVAC system comprising:
   a first cover having a first side wall, a second side wall, a third side wall, a fourth sidewall, and a primary wall, wherein the first cover has a first concave interior portion;
   a plurality of chamber walls extending from the primary wall of the first cover in the first concave interior portion;
   wherein one of the plurality of chamber walls comprises a longitudinal partitioning wall extending from the primary wall into the first concave interior portion, the longitudinal partitioning wall having a first surface and an opposing second surface, wherein the longitudinal partitioning wall is formed with a first aperture and a second aperture;
   a particulate sensor disposed on the first surface of the longitudinal partitioning wall with a sensor intake aligned with the first aperture through the longitudinal partitioning wall and a sensor outlet aligned with the second aperture through the longitudinal partitioning wall;
   a second cover having a primary wall with an interior surface and an exterior surface;
   wherein the first cover and the second cover mate and couple with the first concave interior portion and the interior surface of the second cover facing each other and forming an interior cavity when in an assembled position;
   a wall gasket disposed on a portion of the second cover proximate to the interior surface;
   wherein, when assembled, the plurality of chamber walls interface with the wall gasket and form a plurality of chambers comprising at least a bypass chamber, an intake chamber, and an outlet chamber, and wherein the first aperture of the longitudinal partitioning wall is fluidly coupled to the intake chamber and the second aperture of the longitudinal partitioning wall is fluidly coupled to the outlet chamber, the intake chamber is fluidly coupled to the bypass chamber and the outlet chamber is fluidly coupled to the bypass chamber downstream of the intake chamber;
   an intake conduit fluidly coupled to an upstream portion of the bypass chamber; and
   an outlet conduit fluidly coupled to a downstream portion of the bypass chamber.

2. The indoor air quality monitor of claim 1, wherein the longitudinal partitioning wall has a first angled portion that slants downward on an upstream portion and a second angled portion that slants downward on a downstream portion to facilitate removal of any condensate and wherein the first cover has a first vent slot formed proximate to an upstream edge of the longitudinal partitioning wall and a second vent slot formed proximate to a downstream edge of the longitudinal partitioning wall, wherein downward and upward are referenced for the orientation when the fourth wall of the first cover is orthogonal to gravity.

3. The indoor air quality monitor of claim 1, wherein the longitudinal partitioning wall has a first angled portion that slants downward on an upstream portion and a second angled portion that slants downward on a downstream portion to facilitate removal of any condensate and wherein the first cover has a first vent slot formed proximate to an upstream edge of the longitudinal partitioning wall and a second vent slot formed proximate to a downstream edge of the longitudinal partitioning wall, wherein downward and upward are referenced for the orientation when the fourth wall of the first cover is orthogonal to gravity, and wherein the longitudinal partitioning wall has an intermediate portion that is level between the first angled portion and the second angled portion.

4. The indoor air quality monitor of claim 1, wherein the longitudinal partitioning wall forms an upper portion and a lower portion in the interior cavity, and further comprising a first particulate-sensor-positioning internal wall and a second particulate-sensor-positioning internal wall, wherein the first particulate-sensor-positioning internal wall is displaced from the second particulate-sensor-positioning internal wall.

5. The indoor air quality monitor of claim 1, wherein the bypass chamber comprises:
   a first longitudinal member leading to a first intake chamber aperture;
   wherein an intake-outlet wall is proximate to one side of the intake chamber aperture;
   a bypass fin positioned in the bypass chamber on the fourth wall and substantially aligned with the intake-outlet wall;
   an exit fin extending longitudinally in a downstream direction from the intake-outlet wall and leading to a first outlet chamber aperture; and
   a second longitudinal member extending substantially longitudinally from the third side wall.

6. The indoor air quality monitor of claim 1, wherein the indoor air quality monitor has a longitudinal length, L, and the bypass chamber comprises:
   a first longitudinal member leading to a first intake chamber aperture, wherein the first longitudinal member has a longitudinal length between 0.2 L and 0.35 L;
   wherein an intake-outlet wall is proximate to one side of the intake chamber aperture;
   a bypass fin positioned in the bypass chamber substantially aligned with the intake-outlet wall, wherein the bypass fin has length between 0.03 L and 0.08 L;
   an exit fin extending longitudinally in a downstream direction from the intake-outlet wall and leading to a first outlet chamber aperture, wherein the exit fin has a length between 0.06 L to 0.08 L; and
   a second longitudinal member extending substantially longitudinally from a third side wall, the second longitudinal member having a length between 0.18 L and 0.3 L.

7. The indoor air quality monitor of claim 6, wherein a height of the bypass chamber is between 0.1 L and 0.3 L.

8. The indoor air quality monitor of claim 1, wherein the first cover and the second cover comprises a thermoplastic polymer.

9. The indoor air quality monitor of claim 1,
wherein the longitudinal partitioning wall slants downward on an upstream portion and slants downward on a downstream portion to facilitate removal of any condensate and wherein the first cover has a first vent slot formed proximate to an upstream edge of the longitudinal partitioning wall and a second vent slot formed proximate to a downstream edge of the longitudinal partitioning wall;
wherein the longitudinal partitioning wall forms an upper portion and a lower portion of the interior cavity, and further comprising a first particulate-sensor-positioning internal wall and a second particulate-sensor-positioning internal wall, wherein the first particulate-sensor-positioning internal wall is displaced from the second particulate-sensor-positioning internal wall; and
wherein the indoor air quality monitor has a longitudinal length, L, and the bypass chamber comprises:
   a first longitudinal member leading to a first intake chamber aperture, wherein the first longitudinal member has a longitudinal length between 0.2 L and 0.35 L,
   wherein an intake-outlet wall is proximate to one side of the intake chamber aperture,
   a bypass fin positioned in the bypass chamber substantially aligned with the intake-outlet wall, wherein the bypass fin has length between 0.03 L and 0.08 L,
   an exit fin extending longitudinally in a downstream direction from the intake-outlet wall and leading to a first outlet chamber aperture, wherein the exit fin has a length between 0.06 L to 0.08 L,
   a second longitudinal member extending substantially longitudinally from a third side wall, the second longitudinal member having a length between 0.18 L and 0.3 L, and
   a height of the bypass chamber is between 0.1 L and 0.3 L.

10. The indoor air quality monitor of claim 1, wherein the inlet chamber has a volume V1, the outlet chamber has a volume $V_2$, and $V_1 > V_2$.

11. The indoor air quality monitor of claim 1, wherein monitor body comprises thermoplastic polymer.

12. An indoor air quality monitor for an HVAC system comprising:
   a monitor body formed with an interior cavity;
   the monitor body comprising a plurality of chamber walls in the interior cavity and forming a plurality of chambers;
   wherein one of the plurality of chamber walls comprises a longitudinal partitioning wall having a first surface and an opposing second surface, wherein the longitudinal partitioning wall is formed with a first aperture and a second aperture;
   a particulate sensor disposed on the first surface of the longitudinal partitioning wall with a sensor intake aligned with the first aperture through the longitudinal partitioning wall and a sensor outlet aligned with the second aperture through the longitudinal partitioning wall; and
   wherein the plurality of chambers comprises at least a bypass chamber, an intake chamber, and an outlet chamber, and wherein the first aperture of the longitudinal partitioning wall is fluidly coupled to the intake chamber and the second aperture of the longitudinal partitioning wall is fluidly coupled to the outlet chamber, and wherein the intake chamber is fluidly coupled to the bypass chamber and the outlet chamber is fluidly coupled to the bypass chamber downstream of the inlet chamber.

13. The indoor air quality monitor of claim 12, wherein the monitor body comprises a first cover and a second cover that are coupled when in an assembled position.

14. The indoor air quality monitor of claim 12, wherein the monitor body comprises a first cover and a second cover that are coupled when in an assembled position, and wherein the plurality of chamber walls extends from the first cover that are sized and configured to interface with a wall gasket on an interior of the second cover when in an assembled position.

15. The indoor air quality monitor of claim 12, further comprising an intake conduit fluidly coupled to an upstream portion of the bypass chamber; and an outlet conduit fluidly coupled to a downstream portion of the bypass chamber.

16. The indoor air quality monitor of claim 12, wherein the inlet chamber has a volume $V_1$, the outlet chamber has a volume $V_2$, and $V_1 > V_2$.

17. The indoor air quality monitor of claim 12, wherein monitor body comprises thermoplastic polymer.

18. A heating, ventilating, and air conditioning system comprising:
a return air compartment receiving air from a conditioned space;
a mixing compartment coupled to the return air compartment and a source of outside air;
a filter section;
a cooling section;
a conditioned air section that is fluidly coupled to the conditioned space;
a first indoor air quality monitor having an inlet conduit and an outlet conduit;
wherein the inlet conduit of the first indoor air quality monitor is fluidly coupled to the mixing compartment and the outlet conduit of the first indoor air quality monitor is disposed between the filter section and the cooling section;
a second indoor air quality monitor having an inlet conduit and an outlet conduit;
wherein the inlet conduit of the second indoor air quality monitor is fluidly coupled [to] between the filter section and the cooling section and the outlet conduit of the second indoor air quality monitor is fluidly coupled downstream of the cooling section; and
wherein the first indoor air quality monitor and the second indoor air quality monitor each comprise:
a first cover having a first side wall, a second side wall, a third side wall, a fourth sidewall, and a primary wall, wherein the first cover has a first concave interior portion;
a plurality of chamber walls extending from the primary wall of the first or the second cover in an interior cavity,
wherein one of the plurality of chamber walls comprises a longitudinal partitioning wall extending from the primary wall into the first concave interior portion, the longitudinal partitioning wall having a first surface and an opposing second surface, wherein the longitudinal partitioning wall is formed with a first aperture and a second aperture,
a particulate sensor disposed on the first surface of the longitudinal partitioning wall with a sensor intake aligned with the first aperture through the longitudinal partitioning wall and a sensor outlet aligned with the second aperture through the longitudinal partitioning wall,
a second cover having a primary wall with an interior surface and an exterior surface,
wherein the first cover and the second cover mate and couple with the first concave interior portion and the interior surface of the second cover facing each other and forming the interior cavity when in an assembled position, and
wherein, when assembled, the plurality of chamber walls form, at least in part, a plurality of chambers comprising at least a bypass chamber, an intake chamber, and an outlet chamber, and wherein the first aperture of the longitudinal partitioning wall is fluidly coupled to the intake chamber and the second aperture of the longitudinal partitioning wall is fluidly coupled to the outlet chamber, and wherein the intake chamber is fluidly coupled to the bypass chamber and the outlet chamber is fluidly coupled to the bypass chamber downstream of the inlet chamber.

19. The heating, ventilating, and air conditioning system of claim 18, wherein the first indoor air quality monitor comprises a wireless transmitter for transmitting air quality data.

20. The heating, ventilating, and air conditioning system of claim 18, wherein the first indoor air quality monitor comprises a wireless transmitter for transmitting air quality data, wherein the second indoor air quality monitor comprises a wireless transmitter for transmitting air quality data, and further comprising a controller having a processor, a non-transitory memory, and a receiver for receiving the air quality data from the first indoor air quality monitor and the second indoor quality monitor, whereby air quality differences across the filter are determined and monitored.

* * * * *